United States Patent
Meiners (10) Patent No.: US 7,119,847 B2
(45) Date of Patent: Oct. 10, 2006

(54) METHOD FOR IDENTIFYING FORMAT OF A RECEIVED VIDEO SIGNAL

(75) Inventor: Jason W. Meiners, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 467 days.

(21) Appl. No.: 10/738,232

(22) Filed: Dec. 17, 2003

(65) Prior Publication Data

US 2005/0134736 A1 Jun. 23, 2005

(51) Int. Cl.
*H04N 5/46* (2006.01)

(52) U.S. Cl. ...................... 348/558; 348/554
(58) Field of Classification Search ............... 348/553, 348/558, 554, 555, 557, 467, 464; 345/698, 345/699, 660, 667, 670, 671; H04N 5/46
See application file for complete search history.

(56) References Cited

U.S. PATENT DOCUMENTS 5,990,971 A * 11/1999 Nakai et al. ............ 348/558
6,441,860 B1 * 8/2002 Yamaguchi et al. ....... 348/555

* cited by examiner

*Primary Examiner*—Sherrie Hsia
(74) *Attorney, Agent, or Firm*—Warren L. Franz; W. James Brady; Frederick J. Telecky, Jr.

(57) ABSTRACT

A method for identifying format of a video signal including a raster-synchronizing signal having a timing signal spanning a synch interval and a synch-follower signal level adjacent the synch interval, and a color-related signal, includes the steps: (a) ascertaining (1) first signal level of the color-related signal during the synch interval; (2) synch difference between level of the raster-synchronizing signal during the synch interval and the synch-follower level; and (3) peak excursion for the color-related signal; (b) in any order: (1) if first signal level is greater than a first value, set a first factor at one, else zero; (2) if synch difference is greater than a second value, set a second factor at one, else zero; and (3) if peak excursion is greater than a third value, set a third factor at zero, else one; and (c) employing the factors to identify the format according to predetermined relationships.

13 Claims, 5 Drawing Sheets

METHOD FOR IDENTIFYING FORMAT OF A RECEIVED VIDEO SIGNAL

BACKGROUND OF THE INVENTION

The present invention is directed to methods for identification of format of a received video signal. In its preferred embodiment, the present invention automatically identifies whether a received video signal is a Red-Green-Blue (RGB) graphics signal with embedded timing (also known as RGB—sync on green or RGB-SOG), a YPbPr component video signal with standard bi-level synch signaling or a YPbPr component video signal with tri-level synch signaling.

In order to reduce board area, system cost and product size manufacturers of video projectors and LCD monitors that support both component video and RGB graphics signal inputs often desire to use the same input connector for all received video signals. However, using the same input connector for all video signals creates a need for being able to identify which format video signal is received in order that the receiving product may properly handle the received signal. Prior art video handling products using a single video signal input connector typically require a user to manually identify the format of the receive signal via a user interface, such as a keyboard, selection switch or other user-operated input indicating device.

There is a need for a method for automatically identifying received format of a video signal.

SUMMARY OF THE INVENTION

A method for identifying format of a video signal including a raster-synchronizing signal having a timing signal spanning a synch interval and a synch-follower signal level adjacent the synch interval, and a color-related signal, includes the steps: (a) ascertaining (1) first signal level of the color-related signal during the synch interval; (2) synch difference between level of the raster-synchronizing signal during the synch interval and the synch-follower level; and (3) peak excursion for the color-related signal; (b) in any order: (1) if first signal level is greater than a first value, set a first factor at one, else zero; (2) if synch difference is greater than a second value, set a second factor at one, else zero; and (3) if peak excursion is greater than a third value, set a third factor at zero, else one; and (c) employing the factors to identify the format according to predetermined relationships.

It is, therefore, an object of the present invention to provide a method for automatically identifying received format of a video signal.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

A video picture is made up of video frames. In the United States a video picture is composed of 525 horizontal lines (other standards outside the U.S. have different numbers of lines). These horizontal lines are created by a beam of electrons that write the lines one at a time on the picture tube. When the beam has sprayed 525 of the lines, a viewer sees one still frame of a video picture. The illusion of motion is then created by repeating this process 30 times each second. Each of the 30 frames is a still image, but each shows a progressively different stage of the motion. The resulting video presentation is much like watching a slide show in fast motion. A viewer sees 30 still images each second, but the images blur together in the mind of the viewer to produce the illusion of motion.

The scanning electron beam starts at the top left of the picture tube and writes one horizontal line (raster). When the beam reaches the right hand side of the picture tube (raster area) the beam drops down and writes the next raster from left to right.

In early television systems this process of writing 525 lines for each frame created noticeable flickering of the resulting image. To minimize such flicker engineers developed a system known as "interlaced scanning". The interlace system divides each frame into two separate fields, each with half of the picture information for a total of 525 lines of picture information. The first field contains all odd-numbered lines #1, #2, #3, and so on. The second field contains the even numbered fields #2, #4, #6, and so on. After the first field is scanned for all odd-numbered lines, a vertical synchronization pulse returns the electron beam to the top center of the picture tube and then scans the second field for all of the even-numbered lines. Each of the 30 frames of a video picture includes these two interlaced fields, so the actual scanning rate is 60 fields per second.

Generally, there are three formats of analog video signals that must be correctly recognized in order that a video signal processor may operate correctly. (1) Red-Green-Blue (RGB) graphics signals with embedded timing (also known as RGB—sync on green or RGB-SOG); (2) YPbPr component video signals with standard bi-level synch signaling; and (3) YPbPr component video signals with tri-level synch signaling. These signal formats each use three input lines or wires, with horizontal and vertical timing information contained on the Y or G wire. The system connector generally will specify that the Y and G signals use the same input pin. The R/Pr and B/Pb signals are also generally specified for application to the same input pins.

The reason that these various signals must be correctly distinguished is that they carry information in different representations. Table 1 indicates major signal attributes that distinguish the various signals:

TABLE 1

| Format | Color Space | Voltage Range | Ref. Level | Synch Edge |
|---|---|---|---|---|
| RGB-SOG | RGB | −300–700 mV (G) | 0 V (G) | Falling Edge |
| | | 0–700 MV (BR) | 0 V (BR) | No Sync |
| YPbPr bi | YPbPr | −300–700 mV (Y) | 0 V | Falling Edge |
| | | −350–350 mV (PbPr) | 0 V | No Sync |
| YPbPr tri | YPbPr | −300–700 mV (Y) | 0 V | Rising Edge |
| | | −350–350 mV (PbPr) | 0 V | Sync Optional |

Figure 1:
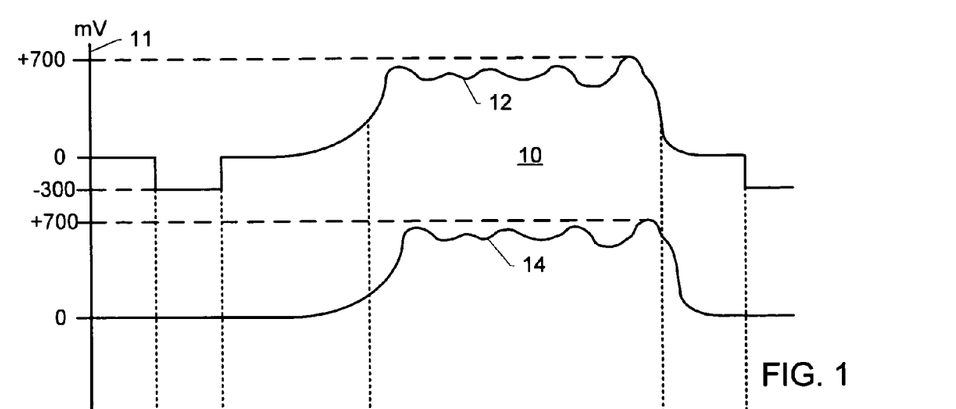
FIG. 1 is a graphic representation of a Red-Green-Blue (RGB) video signal.

FIG. 1 is a graphic representation of a Red-Green-Blue (RGB) video signal. In FIG. 1, an RGB video signal 10 is plotted against a vertical axis 11 representing signal strength, expressed in millivolts, and a horizontal axis 13 representing display location, expressed in pixels. RGB signal 10 includes a raster-synchronizing signal 12 and a color-related signal 14. In actuality RGB signal 10 will include three color-related signals: red, green and blue. Raster-synchronizing signal 12 is the green signal of red-green-blue (RGB) and for that reason RGB video signal 10 is sometimes referred to as an RGB synchronized-on-green (RGB-SOG) signal. Only one other color-related signal 14 (either red or blue) is illustrated in FIG. 1 to simplify the explanation of the method of the present invention. The method of the present invention may be practiced using only the raster-synchronizing signal and one color-related signal.

Raster-synchronizing signal 12 begins at pixel $p_0$ at a signal level of 0 millivolts and stays at signal level 0 millivolts until pixel $p_1$. At pixel $p_1$, raster-synchronizing signal 12 drops to −300 millivolts, and remains at −300 millivolts until pixel $p_3$. The signal deviation during the pixel interval $p_1$–$p_3$ is a raster synch signal indicating when raster-synchronizing signal 12 is to return to a start position at the left side of a picture tube to begin displaying a new line (raster). Raster-synchronizing signal 12 resumes a signal level of 0 millivolts from pixel $p_3$ until sometime before pixel $p_4$. Between pixel $p_3$ and pixel $p_4$ raster-synchronizing signal 12 begins to rise. Raster-synchronizing signal 12 begins indicating image-related information approximately at pixel $p_4$ or shortly thereafter and continues indicating image-related information until approximately pixel $p_5$. Raster synchronizing signal 12 achieves a maximum excursion of approximately +700 millivolts during the interval $p_4$–$p_5$. After approximately pixel $p_5$, raster-synchronizing signal 12 returns to 0 millivolts. At pixel $p_6$ raster-synchronizing signal 12 experiences another raster-synch signal to begin a new line (raster) at the left side of the picture tube.

The signal profile of raster-synchronizing signal 12 between pixels $p_0$, $p_1$ is commonly referred to as the "front porch" of raster-synchronizing signal 12. The signal profile between pixels $p_1$, $p_3$ is commonly referred to as the "horizontal synch" of raster-synchronizing signal 12. The substantially level portion of the signal profile following pixel $p_3$ is commonly referred to as the "back porch" of raster-synchronizing signal 12.

Raster-synchronizing signal 12 and color-related signal 14 (and the other color-related signal of RGB signal 10, not shown in FIG. 1) typically originate from a common electronic board and so are typically inherently in synchronization so that raster-synchronizing signal 12 and color-related signal 14 (and the other color-related signal of RGB signal 10, not shown in FIG. 1) present synchronized information for display. The horizontal synch of raster-synchronizing signal 12 is a raster-synchronizing signal for controlling when a new line (raster) is to begin.

Color-related signal 14 begins at pixel $p_0$ at 0 millivolts and continues at that level until after pixel $p_3$. Color-related signal 14 begins to rise approximately as raster-synchronizing signal 12 rises after pixel $p_3$ (the two signals 12, 14 are synchronized, as mentioned earlier). Color-related signal 14 begins indicating image-related information approximately at pixel $p_4$ or shortly thereafter and continues indicating image-related information until approximately pixel $p_5$. After approximately pixel $p_5$, color-related signal 14 returns to 0 millivolts and remains at 0 millivolts until after pixel $p_6$. Color-related signal 14 has no raster-synch. Color-related signal 14 achieves a maximum excursion of approximately +700 millivolts during the interval $p_4$–$p_5$.

Figure 2:
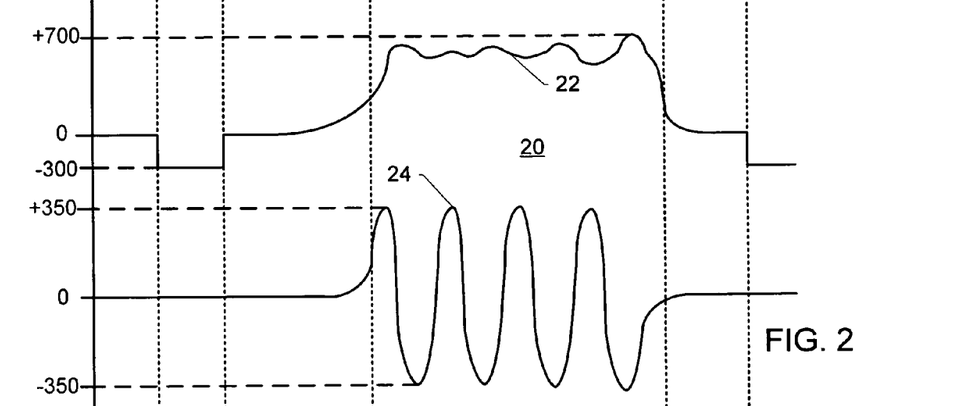
FIG. 2 is a graphic representation of a YPbPr bi-synch component video signal.

FIG. 2 is a graphic representation of a YPbPr bi-synch component video signal. A YPbPr signal is a component video signal having a color difference format. The color difference format is produced by linear addition and scaling of RGB to implement equations:

$$Y = (K_r \cdot E_r) + (K_g \cdot E_g) + (K_b \cdot E_b) \quad [1]$$

$$P_b = K_{cb} \cdot (B - Y) \quad [2]$$

$$P_r = K_{cr} \cdot (R - Y) \quad [3]$$

Y is referred to as "Luma" and relates to luminance of the image. The coefficients Kr, Kg, Kb) are the same for several of various standards, for example, NTSC (National Television Standards Committee), PAL (Phase Alternating Line) and SECAM (Sequential Couleur avec Memoire).

In FIG. 2, a YPbPr video signal 20 is plotted against vertical axis 11 and horizontal axis 13. YPbPr signal 20 includes a raster-synchronizing luminance-related signal 22 and a color-related signal 24. In actuality YPbPr signal 20 will include two color-related signals, but only one color-related signal 24 is illustrated here to simplify the explanation of the method of the present invention. The method of the present invention may be practiced using only the raster-synchronizing signal and one color-related signal.

Luminance-related signal 22 begins at pixel $p_0$ at a signal level of 0 millivolts and stays at signal level 0 millivolts until pixel $p_1$. At pixel $p_1$, luminance-related signal 12 drops to −300 millivolts, and remains at −300 millivolts until pixel $p_3$. The signal deviation during the pixel interval $p_1$–$p_3$ is a raster synch signal indicating when luminance-related signal 22 is to return to a start position at the left side of a picture tube to begin displaying a new line (raster). Luminance-related signal 22 resumes a signal level of 0 millivolts from pixel $p_3$ until sometime before pixel $p_4$. Between pixel $p_3$ and pixel $p_4$ luminance-related signal 22 begins to rise. Luminance-related signal 22 begins indicating image-related information approximately at pixel $p_4$ or shortly thereafter and continues indicating image-related information until approximately pixel $p_5$. Luminance-related signal 22 achieves a maximum excursion of approximately +700 millivolts during the interval $p_4$–$p_5$. After approximately pixel $p_5$, luminance-related signal 22 returns to 0 millivolts. At pixel $p_6$ luminance-related signal 22 experiences another raster synch signal to begin a new line (raster) at the left side of the picture tube.

The signal profile between pixels $p_0$, $p_1$ is commonly referred to as the "front porch" of luminance-related signal 22. The signal profile between pixels $p_1$, $p_3$ is commonly referred to as the "horizontal synch" of luminance-related signal 22. The substantially level portion of the signal profile following pixel $p_3$ is commonly referred to as the "back porch" of luminance-related signal 22. Luminance-related signal 22 is further referred to as bi-level synch luminance signal because the raster synch is established at two levels during the interval $p_1$–$p_3$, as distinguished from a tri-level synch luminance signal (FIG. 3) having a raster synch established at three levels during the interval $p_1$–$p_3$.

Luminance-related signal 22 and color-related signal 24 (and the other color-related signal of YPbPr signal 20, not shown in FIG. 2) typically originate from a common electronic board and so are typically inherently in synchronization so that luminance-related signal 22 and color-related signal 24 (and the other color-related signal of YPbPr signal 20, not shown in FIG. 2) present synchronized luminance- and color-related information for display. The horizontal synch of luminance-related signal 22 is a raster-synchronizing signal for controlling when a new line (raster) is to begin.

Color-related signal 24 begins at pixel $p_0$ at 0 volts and continues at that level until after pixel $p_3$. Color-related signal 24 begins to rise approximately as luminance-related signal 22 rises after pixel $p_3$ (they are synchronized, as mentioned earlier). Color-related signal 24 begins indicating image-related information approximately at pixel $p_4$ or shortly thereafter and continues indicating image-related information until approximately pixel $p_5$. After approximately pixel $p_5$, color-related signal 24 returns to 0 millivolts and remains at 0 millivolts until after pixel $p_6$. Color-related signal 24 has no raster-synch. Color-related signal 24 achieves maximum excursions of approximately ±350 millivolts during the interval $p_4$–$p_5$.

Figure 3:
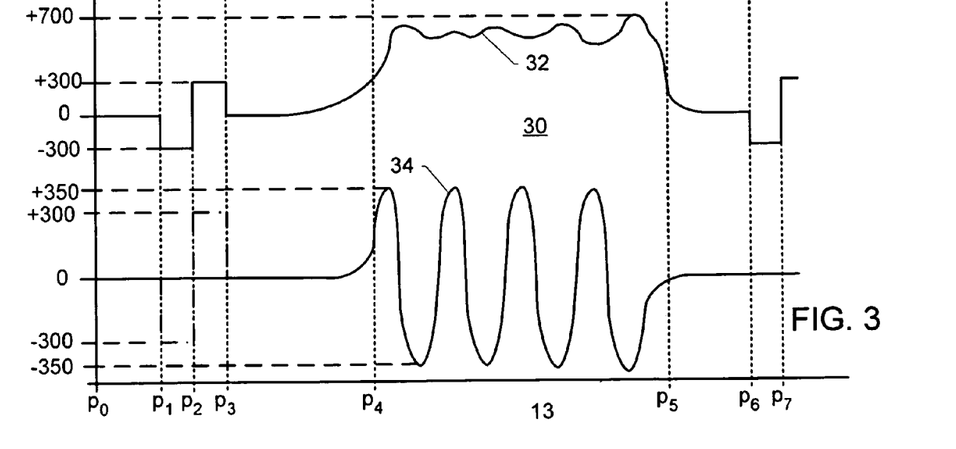
FIG. 3 is a graphic representation of a YPbPr tri-synch component video signal.

FIG. 3 is a graphic representation of a YPbPr tri-synch component video signal. In FIG. 3, a YPbPr video signal 30 is plotted against vertical axis 11 and horizontal axis 13. YPbPr signal 30 includes a raster-synchronizing luminance-related signal 32 and a color-related signal 34. In actuality YPbPr signal 30 will include two color-related signals, but only one color-related signal 34 is illustrated here to simplify the explanation of the method of the present invention. The method of the present invention may be practiced using only the raster-synchronizing luminance-related signal and one color-related signal. In its most preferred embodiment, the method of the present invention is practiced using the raster-synchronizing signal and both color related signals.

Luminance-related signal 32 begins at pixel $p_0$ at a signal level of 0 millivolts and stays at signal level 0 millivolts until pixel $p_1$. At pixel $p_1$, luminance-related signal 32 drops to −300 millivolts, and remains at −300 millivolts until pixel $p_2$. At pixel $p_2$ luminance-related signal 32 rises to +300 millivolts, and remains at +300 millivolts until pixel $p_3$. The signal deviation during the pixel interval $p_1$–$p_3$ is a raster synch signal indicating when luminance-related signal 32 is to return to a start position at the left side of a picture tube to begin displaying a new line (raster). Luminance-related signal 32 resumes a signal level of 0 millivolts from pixel $p_3$ until sometime before pixel $p_4$. Luminance-related signal 32 is further referred to as tri-level synch luminance signal because the raster synch is established at three levels during the interval $p_1$–$p_3$, as distinguished from a bi-level synch luminance signal (FIG. 2) having a raster synch established at two levels during the interval $p_1$–$p_3$. Between pixel $p_3$ and pixel $p_4$ luminance-related signal 32 begins to rise. Luminance-related signal 32 begins indicating image-related information approximately at pixel $p_4$ or shortly thereafter and continues indicating image-related information until approximately pixel $p_5$. Luminance-related signal 32 achieves a maximum excursion of approximately +700 millivolts during the interval $p_4$–$p_5$. After approximately pixel $p_5$, luminance-related signal 32 returns to 0 millivolts. At pixel $p_6$ luminance-related signal 32 experiences another raster synch signal to begin a new line (raster) at the left side of the picture tube.

The signal profile between pixels $p_0$, $p_1$ is commonly referred to as the "front porch" of luminance-related signal 32. The signal profile between pixels $p_1$, $p_3$ is commonly referred to as the "horizontal synch" of luminance-related signal 32. The substantially level portion of the signal profile following pixel $p_3$ is commonly referred to as the "back porch" of luminance-related signal 32.

Luminance-related signal 32 and color-related signal 34 (and the other color-related signal of YPbPr signal 30, not shown in FIG. 3) typically originate from a common electronic board and so are typically inherently in synchronization so that luminance-related signal 32 and color-related signal 34 (and the other color-related signal of YPbPr signal 30, not shown in FIG. 3) present synchronized luminance- and color-related information for display. The horizontal synch of luminance-related signal 32 is a raster-synchronizing signal for controlling when a new line (raster) is to begin.

Color-related signal 34 begins at pixel $p_0$ at 0 millivolts and continues at that level until after pixel $p_3$. Color-related signal 34 begins to rise approximately as luminance-related signal 32 rises after pixel $p_3$ (they are synchronized, as mentioned earlier). Color-related signal 34 begins indicating image-related information approximately at pixel $p_4$ or shortly thereafter and continues indicating image-related information until approximately pixel $p_5$. After approximately pixel $p_5$, color-related signal 34 returns to 0 millivolts and remains at 0 millivolts until after pixel $p_6$. Color-related signal 34 has no raster-synch. Color-related signal 34 achieves maximum excursions of approximately ±350 millivolts during the interval $p_4$–$p_5$.

Color-related signal 34 may also be provided a tri-synch signal as indicated in dotted line format in FIG. 3. If color-related signal 34 has a tri-level synch, at pixel $p_1$ color-related signal 34 will drop to −300 millivolts, and remain at −300 millivolts until pixel $p_2$. At pixel $p_2$ color-related signal 34 will rise to +300 millivolts, and remain at +300 millivolts until pixel $p_3$.

The invention is a method for identifying format of a received video signal that includes a first raster-synchronizing constituent signal and a second color-related constituent signal. The first signal includes a timing signal spanning a synch interval and a synch-follower signal level adjacent the synch interval (i.e., the back porch). The method may be used, by way of example and not by way of limitation, to identify which format video signal among an RGB-SOG signal (e.g., RGB-SOG signal 10; FIG. 1), a YPbPr bi-synch signal (e.g., YPbPr signal 20; FIG. 2) and a YPbPr tri-synch signal (e.g., YPbPr signal 30; FIG. 3) is received. A first step of the method is to ascertain a first parameter regarding signal level of the color-related signal received (e.g., signals 14, 24, 34; FIGS. 1–3); ascertain a second parameter regarding a difference between level of the raster-synch signal during the synch interval and the back porch of the raster-synchronizing signal received (e.g., signals 12, 22, 32; FIGS. 1–3); and ascertain a third parameter regarding peak excursion levels for the color-related signal.

A preferred first step in carrying out the method is to clamp the received signals (e.g., signals 12 14; FIG. 1—signals 22, 24; FIG. 2—signals 32, 34; FIG. 3) to a reference level. The signals preferably have their respective lowest values clamped to zero.

Figure 4:
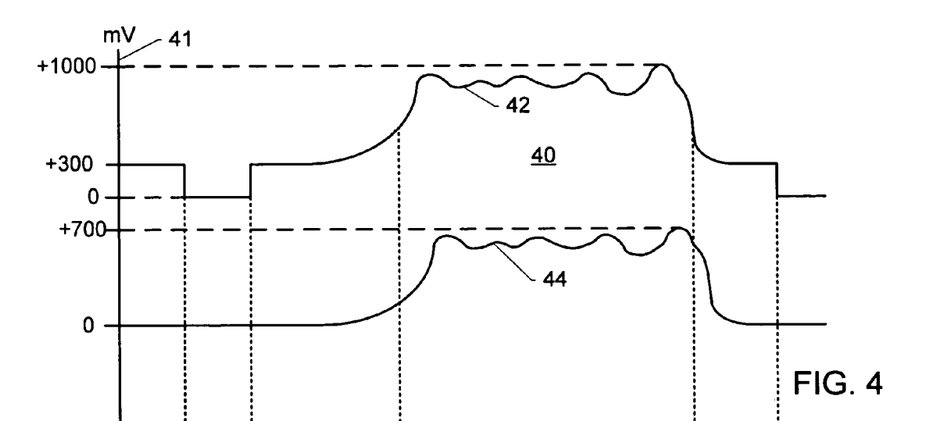
FIG. 4 is a graphic representation of the Red-Green-Blue (RGB) video signal of FIG. 1 clamped to zero volts for carrying out the preferred embodiment of the method of the present invention.

FIG. 4 is a graphic representation of the Red-Green-Blue (RGB) video signal of FIG. 1 clamped to zero volts for carrying out the preferred embodiment of the method of the present invention. In FIG. 4, an RGB video signal 40 is plotted against a vertical axis 41 representing signal strength, expressed in millivolts, and plotted against a horizontal axis 43 representing display location, expressed in pixels. RGB signal 40 includes a raster-synchronizing signal 42 and a color-related signal 44.

Raster-synchronizing signal 42 has its lowest value clamped to zero, so raster-synchronizing signal 42 begins at pixel $p_0$ at a signal level of +300 millivolts and stays at signal level +300 millivolts until pixel $p_1$. At pixel $p_1$, raster-synchronizing signal 42 drops to 0 millivolts, and remains at 0 millivolts until pixel $p_3$. The signal deviation during the pixel interval $p_1$–$p_3$ is a raster synch signal indicating when raster-synchronizing signal 42 is to return to a start position at the left side of a picture tube to begin displaying a new line (raster). Raster-synchronizing signal 42 resumes a signal level of +300 millivolts from pixel $p_3$ until sometime before pixel $p_4$. Between pixel $p_3$ and pixel $p_4$ raster-synchronizing signal 42 begins to rise. Raster-synchronizing signal 42 begins indicating image-related information approximately at pixel $p_4$ or shortly thereafter and continues indicating image-related information until approximately pixel $p_5$. Raster synchronizing signal 42 achieves a maximum excursion of approximately +1000 millivolts during the interval $p_4$–$p_5$. After approximately pixel $p_5$, raster-synchronizing signal 42 returns to +300 millivolts. At pixel $p_6$ raster-synchronizing signal 42 experiences another raster synch signal to begin a new line (raster) at the left side of the picture tube.

Raster-synchronizing signal 42 and color-related signal 44 typically originate from a common electronic board and so are typically inherently in synchronization so that raster-synchronizing signal 42 and color-related signal 44 present synchronized information for display.

Color-related signal 44 begins at pixel $p_0$ at 0 millivolts and continues at that level until after pixel $p_3$. Color-related signal 44 is essentially the same in its zero-clamped orientation (FIG. 4) as it is in its normal non-clamped orientation (FIG. 1). In order to avoid repetitious prolixity, no further description of zero-clamped color-related signal 44 will be recited other than to observe that color-related signal 44 achieves a maximum excursion of approximately +700 millivolts.

Figure 5:
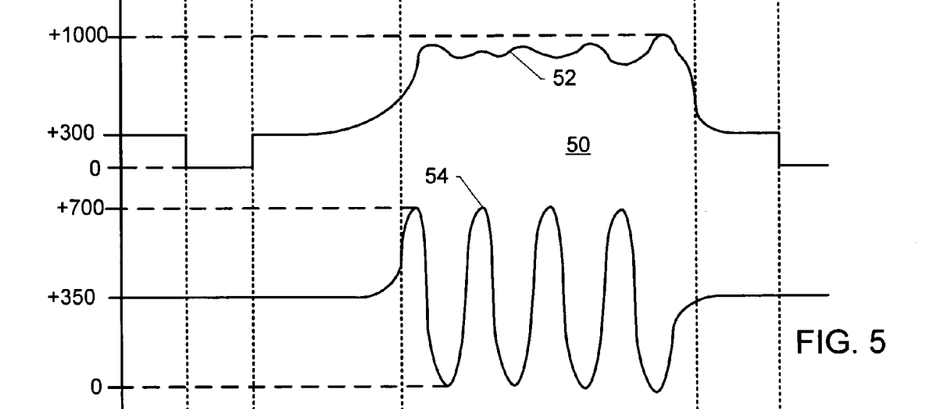
FIG. 5 is a graphic representation of the YPbPr bi-synch component video signal of FIG. 1 clamped to zero volts for carrying out the preferred embodiment of the method of the present invention.

FIG. 5 is a graphic representation of the YPbPr bi-synch component video signal of FIG. 1 clamped to zero volts for carrying out the preferred embodiment of the method of the present invention. In FIG. 5, a YPbPr video signal 50 is plotted against vertical axis 41 and horizontal axis 43. YPbPr signal 50 includes a raster-synchronizing luminance-related signal 52 and a color-related signal 54.

Luminance-related signal 52 has its lowest value clamped to zero, so luminance-related signal 52 begins at pixel $p_0$ at a signal level of +300 millivolts and stays at signal level +300 millivolts until pixel $p_1$. At pixel $p_1$, luminance-related signal 52 drops to 0 millivolts, and remains at 0 millivolts until pixel $p_3$. The signal deviation during the pixel interval $p_1$–$p_3$ is a raster synch signal indicating when luminance-related signal 52 is to return to a start position at the left side of a picture tube to begin displaying a new line (raster). Luminance-related signal 52 resumes a signal level of +300 millivolts from pixel $p_3$ until sometime before pixel $p_4$. Between pixel $p_3$ and pixel $p_4$ luminance-related signal 52 begins to rise. Luminance-related signal 52 begins indicating image-related information approximately at pixel $p_4$ or shortly thereafter and continues indicating image-related information until approximately pixel $p_5$. Luminance-related signal 52 achieves a maximum excursion of approximately +1000 millivolts during the interval $p_4$–$p_5$. After approximately pixel $p_5$, luminance-related signal 52 returns to +300 millivolts. At pixel $p_6$ luminance-related signal 52 experiences another raster synch signal to begin a new line (raster) at the left side of the picture tube.

Luminance-related signal 52 and color-related signal 54 typically originate from a common electronic board and so are typically inherently in synchronization so that luminance-related signal 52 and color-related signal 54 present synchronized luminance- and color-related information for display.

Color-related signal 54 begins at pixel $p_0$ at +350 millivolts and continues at that level until after pixel $p_3$. Color-related signal 54 begins to rise approximately as luminance-related signal 52 rises after pixel $p_3$ (they are synchronized, as mentioned earlier). Color-related signal 54 begins indicating image-related information approximately at pixel $p_4$ or shortly thereafter and continues indicating image-related information until approximately pixel $p_5$. After approximately pixel $p_5$, color-related signal 24 returns to +350 millivolts and remains at +350 millivolts until after pixel $p_6$. Color-related signal 54 has no raster-synch. Color-related signal 54 achieves a maximum excursion of approximately +700 millivolts.

Figure 6:
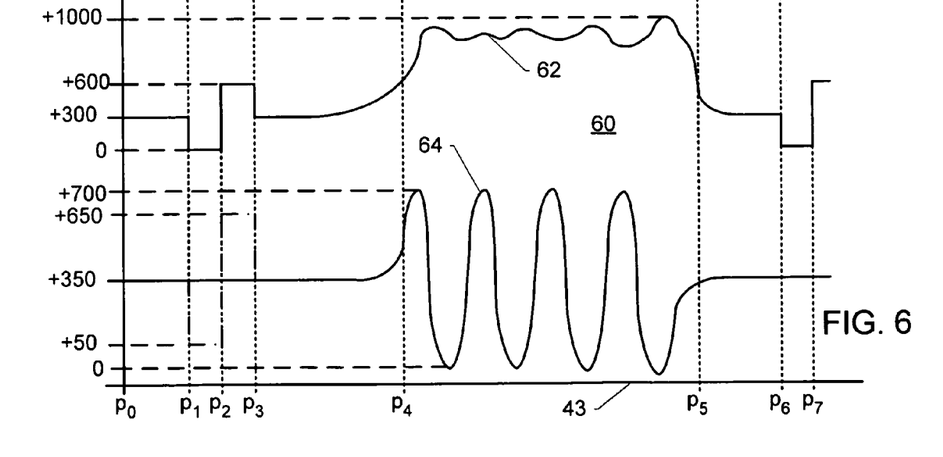
FIG. 6 is a graphic representation of the YPbPr tri-synch component video signal of FIG. 1 clamped to zero volts for carrying out the preferred embodiment of the method of the present invention

FIG. 6 is a graphic representation of the YPbPr tri-synch component video signal of FIG. 1 clamped to zero volts for carrying out the preferred embodiment of the method of the present invention. In FIG. 6, a YPbPr video signal 60 is plotted against vertical axis 41 and horizontal axis 43. YPbPr signal 60 includes a raster-synchronizing luminance-related signal 62 and a color-related signal 64.

Luminance-related signal 62 begins at pixel $p_0$ at a signal level of +300 millivolts and stays at signal level +300 millivolts until pixel $p_1$. At pixel $p_1$, luminance-related signal 62 drops to 0 millivolts, and remains at 0 millivolts until pixel $p_2$. At pixel $p_2$ luminance-related signal 62 rises to +300 millivolts, and remains at +300 millivolts until pixel $p_3$. The signal deviation during the pixel interval $p_1$–$p_3$ is a raster synch signal indicating when luminance-related signal 62 is to return to a start position at the left side of a picture tube to begin displaying a new line (raster). Luminance-related signal 62 resumes a signal level of +300 millivolts from pixel $p_3$ until sometime before pixel $p_4$. Between pixel $p_3$ and pixel $p_4$ luminance-related signal 62 begins to rise. Luminance-related signal 62 begins indicating image-related information approximately at pixel $p_4$ or shortly thereafter and continues indicating image-related information until approximately pixel $p_5$. Luminance-related signal 62 achieves a maximum excursion of approximately +1000 millivolts during the interval $p_4$–$p_5$. After approximately pixel $p_5$, luminance-related signal 62 returns to +300 millivolts. At pixel $p_6$ luminance-related signal 62 experiences another raster synch signal to begin a new line (raster) at the left side of the picture tube.

Luminance-related signal 62 and color-related signal 64 typically originate from a common electronic board and so are typically inherently in synchronization so that luminance-related signal 62 and color-related signal 64 present synchronized luminance- and color-related information for display. Color-related signal 64 begins at pixel $p_0$ at +350 millivolts and continues at that level until after pixel $p_3$. Color-related signal 64 begins to rise approximately as luminance-related signal 62 rises after pixel $p_3$ (they are synchronized, as mentioned earlier). Color-related signal 64 begins indicating image-related information approximately at pixel $p_4$ or shortly thereafter and continues indicating image-related information until approximately pixel $p_5$. After approximately pixel $p_5$, color-related signal 64 returns to +350 millivolts and remains at +350 millivolts until after pixel $p_6$. Color-related signal 64 achieves a maximum excursion of approximately +700 millivolts.

The method of the present invention continues with the step of: (1) if the first parameter is greater than a first predetermined value, stetting a first factor at one, else setting the first factor at zero; (2) if the second parameter is greater than a second predetermined value, setting a second factor at one, else setting the second factor at zero; and (3) if the third parameter is greater than a third predetermined value, setting a third factor at zero, else setting the third factor at one.

Measuring the zero-clamped color-related signal (e.g., signals 44, 54, 64; FIGS. 4–6) during a sample period occupying at least a portion of the synch interval (interval $p_1$–$p_3$; FIGS. 4–6) provides a synch interval measured value. If the synch interval measured value is greater than 50 millivolts (a first predetermined value), then a first factor may be set at one, else the first factor may be set at zero. Among the zero-clamped signals illustrated in FIGS. 4–6, one may observe that only YPbPr color-related signals (signals 54, 64; FIGS. 5 and 6) have a value greater than zero in the synch interval (i.e., interval $p_1$–$p_3$).

Accumulating samples of the zero-clamped first raster-synchronizing signal (e.g., signals 42, 52 , 62; FIGS. 4–6) over the sample period occupying at least a portion of the synch interval (interval $p_1$–$p_3$; FIGS. 4–6) provides an accumulated synch value for the sampled first signal. Multiplying the synch-follower signal (i.e., the back porch—the signal following pixel $p_3$; FIGS. 4–6) times the number of samples accumulated in arriving at the accumulated synch value provides a synch-follower sample level. Ensuring the same number of samples is used in determining the accumulated synch value and the synch-follower sample level provides an "apples to apples" comparison between the signal levels during the synch interval and after the synch interval so that subtracting the synch-follower sample level from the accumulated signal synch value provides an accumulated sample difference value indicative of the signal level during the synch interval. If the accumulated sample difference value is less than 50 millivolts (a second predetermined value), then a second factor may be set at one, else the second factor may be set at zero.

Measuring peak amplitude or peak signal excursion of the zero-clamped color-related signal (e.g., signals 44, 54, 64; FIGS. 4–6) provides a peak difference value for the color-related signal. If the peak difference value is greater than 350 millivolts (a third predetermined value), then a third factor may be set at zero, else the third factor may be set at one.

The first, second and third factors may be employed to identify the format of the received signal according to predetermined relationships. In the context of signals represented in FIGS. 1–3, the preferred predetermined relationships are embodied in Table 2:

TABLE 2

| 1st Factor | 2nd Factor | 3rd Factor | Received Format |
| --- | --- | --- | --- |
| 0 | 0 | 0 | RGB graphic signal format with raster synchronization on green; |
| 0 | 0 | 1 | Ambiguous; |
| 0 | 1 | 0 | ERROR; |
| 0 | 1 | 1 | YPbPr video signal format with tri-level raster synchronization; |
| 1 | 0 | 0 | ERROR; |
| 1 | 0 | 1 | YPbPr video signal format with bi-level raster synchronization; |
| 1 | 1 | 0 | ERROR; |
| 1 | 1 | 1 | YPbPr video signal format with tri-level raster synchronization. |

Figure 7:
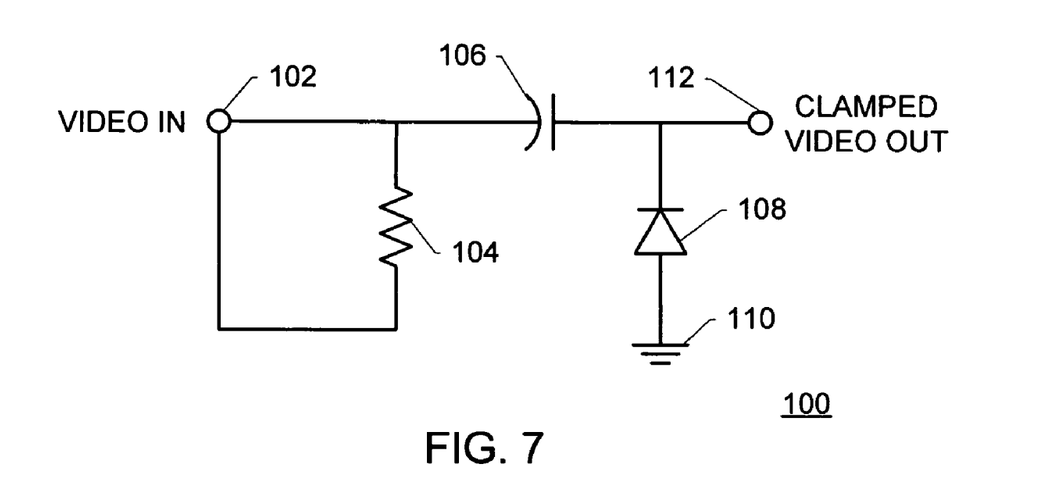
FIG. 7 is an electrical schematic diagram illustrating a circuit for use in clamping video signals for carrying out the preferred embodiment of the method of the present invention.

FIG. 7 is an electrical schematic diagram illustrating a circuit for use in clamping video signals for carrying out the preferred embodiment of the method of the present invention. In FIG. 7, a clamping circuit 100 receives a video input signal (e.g., signal 12, 14, 22, 24, 32 or 34; FIGS. 1–3) at an input locus 102 to apply the video input signal across a resistor 104. Resistor 104 represents the standardized 50 ohm input impedance required at the input of many video devices. The video input signal is passed through a capacitor 106 to remove high frequency noise. A diode 108 coupled to ground 110 clamps the input video signal to a voltage determined by the voltage drop across diode 108 to present a clamped video signal at an output locus 112. The voltage drop across diode 108 is preferably selected to be low so that the input video signal is essentially clamped to zero volts.

Figure 8:
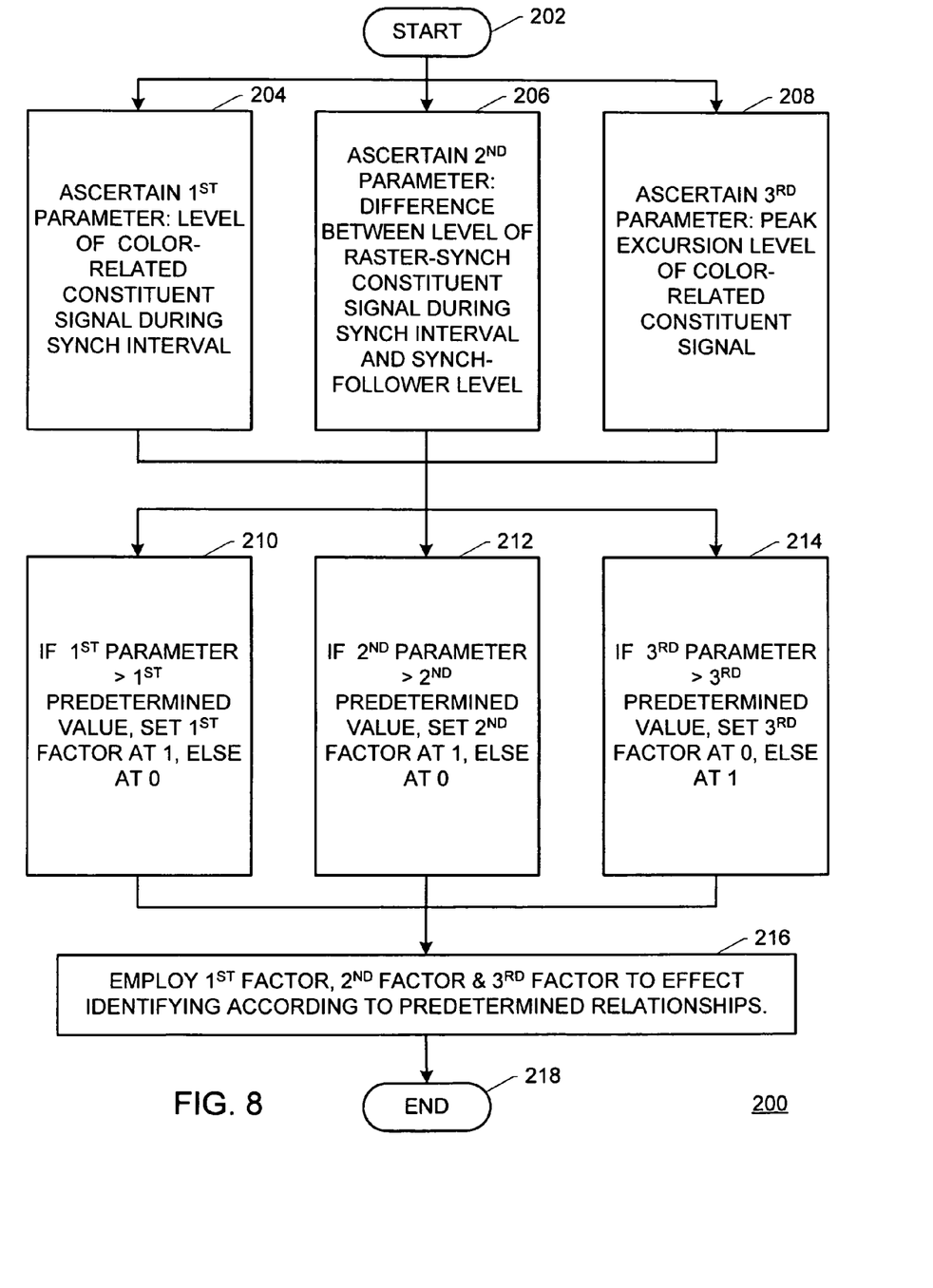
FIG. 8 is a flow chart illustrating the method of the present invention.

FIG. 8 is a flow chart illustrating the method of the present invention. In FIG. 8, a method 200 for identifying format of a received video signal begins at a START locus 202. The video signal includes a first raster-synchronizing constituent signal and a second color-related constituent signal. The first signal includes a timing signal spanning a synch interval and a synch-follower signal level adjacent to the synch interval. Method 200 continues with the step of (a) ascertaining, in no particular order: (1) a first parameter comprising signal level of the second signal during the synch interval, as indicated by a block 204; (2) a second parameter comprising a difference between level of the first signal during the synch interval and the synch-follower level, as indicated by a block 206; and (3) a third parameter comprising peak excursion level for the second signal, as indicated by a block 208.

Method 200 continues with the step of (b) in no particular order: (1) if the first parameter is greater than a first predetermined value, set a first factor at one, else set the first factor at zero, as indicated by a block 210; (2) if the second parameter is greater than a second predetermined value, set a second factor at one, else set the second factor at zero, as indicated by a block 212; and (3) if the third parameter is greater than a third predetermined value, set a third factor at zero, else set the third factor at one, as indicated by a block 214.

Method 200 continues with the step of (c) employing the first factor, the second factor and the third factor to effect the format identifying according to predetermined relationships, as indicated by a block 216. Method 200 terminates at an END locus 218.

Figure 9:
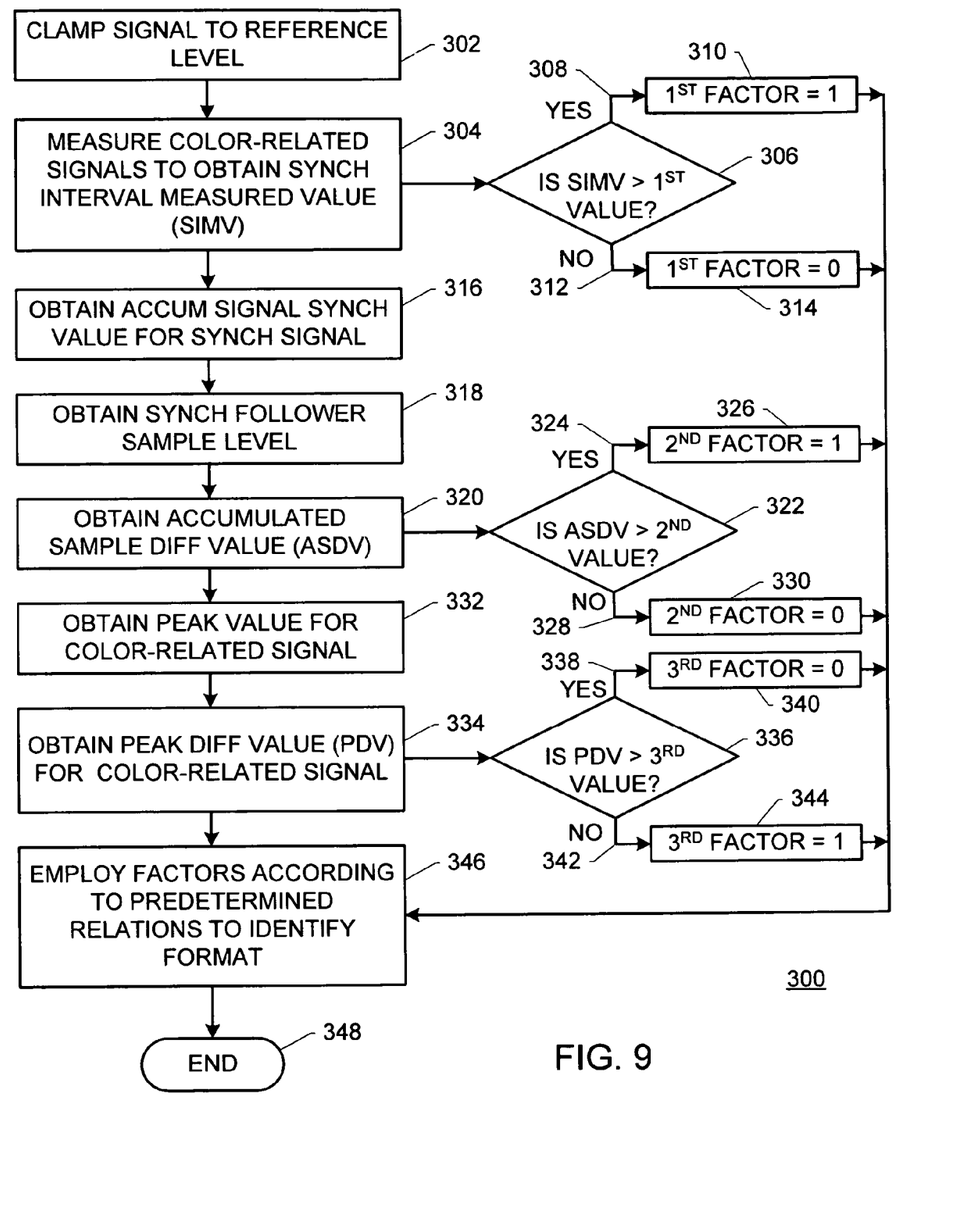
FIG. 9 is a flow chart illustrating the preferred embodiment of the method of the present invention.

FIG. 9 is a flow chart illustrating the preferred embodiment of the method of the present invention. In FIG. 9, a method 300 is illustrated for effecting identification of received format of a video signal at an input locus including a first pin and a second pin, the video signal including a plurality of constituent signals including a raster-synchronizing constituent signal received at the first pin and a color-related constituent signal received at the second pin. The raster-synchronizing first constituent signal includes a timing signal occupying a raster synch interval and a synch-follower signal level adjacent the raster synch interval. Method 300 begins with the step of clamping the plurality of constituent signals to a reference level, as indicated by a block 302.

Method 300 continues with the step of measuring the color-related constituent signal during a sample period occupying at least a portion of the raster synch interval to obtain a synch interval measured value (SIMV) for the color-related constituent signal, as indicated by a block 304.

A query is posed whether the synch interval measured value is greater than a first predetermined value for the color-related constituent signal, as indicated by a query block 306. If the synch interval measured value is greater than the first predetermined value, method 300 proceeds according to YES response line 308 and a first factor is set at one, as indicated by a block 310. If the synch interval measured value is not greater than the first predetermined value, method 300 proceeds according to NO response line 312 and the first factor is set at zero, as indicated by a block 314.

Method 300 proceeds with the step of accumulating samples of the raster-synchronizing constituent signal over the sample period to obtain an accumulated signal synch value for the raster-synchronizing constituent signal during the sample period, as indicated by a block 316. Method 300 continues with the step of multiplying the respective synch-follower signal level of the raster-synchronizing constituent signal times the number of samples accumulated in the step represented by block 316 to obtain a synch-follower sample level, as indicated by a block 318. Method 300 continues with the step of subtracting the synch-follower sample level from the accumulated signal synch value to obtain an accumulated sample difference value (ASDV), as indicated by a block 320.

A query is posed whether the accumulated sample difference value is greater than a second predetermined value for the raster-synchronizing constituent signal, as indicated by a query block 322. If the accumulated sample difference value is greater than the second predetermined value, method 300 proceeds according to YES response line 324 and a second factor is set at one, as indicated by a block 326. If the accumulated sample difference value is not greater than the second predetermined value, method 300 proceeds according to NO response line 328 and the second factor is set at zero, as indicated by a block 330.

Method 300 proceeds with the step of measuring peak amplitude of the color-related constituent signal to obtain a peak value for the color-related constituent signal, as indicated by a block 332. Method 300 continues with the step of subtracting the synch interval measured value for the color-related constituent signal from the peak value for the color-related constituent signal to obtain a peak difference value (PDV)for the color-related constituent signal, as indicated by a block 334.

A query is posed whether the peak difference value is greater than a third predetermined value for the color-related constituent signal, as indicated by a query block 336. If the peak difference value is greater than the third predetermined value, method 300 proceeds according to YES response line 338 and a third factor is set at zero, as indicated by a block 340. If the peak difference value is not greater than the third predetermined value, method 300 proceeds according to NO response line 342 and the third factor is set at one, as indicated by a block 344.

Method 300 continues with the step of employing the first factor, the second factor and the third factor to effect the identification of received format according to predetermined relationships among the first factor (received from block 310 or block 314), the second factor (received from block 326 or block 330) and the third factor (received from block 340 or block 344), as indicated by a block 346. Method 300 terminates at an END locus 348.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for effecting identification of received format of a video signal at an input locus including a first input pin and a second input pin; said received format being one of a first format, a second format or a third format; said first format being a broadcast video signal format including a color-related signal received at said second input pin and a synchronizing color-related signal received at said first input pin and having a bi-level raster timing signal occupying a raster synch interval and a respective synch-follower signal level after said raster synch interval; said second format being a first color difference component video signal including a first color-difference signal received at said second input pin, and a first luminance-related signal received at said first input pin and having a bi-level raster timing signal occupying said raster synch interval and a respective synch-follower signal level after said raster synch interval; said third format being a second color difference component video signal including a second color-difference signal received at said second input pin, and a second luminance-related signal received at said first input pin and having a tri-level raster timing signal occupying said raster synch interval and a respective synch-follower signal level after said raster synch interval; the method comprising the steps of:

(a) clamping the received signals to a reference level at each of said first input pin and said second input pin;
(b) measuring said received signal at said second input pin during a sample period occupying at least a portion of said raster synch interval to obtain a synch interval measured value for said signal received at said second input pin;
(c) if said synch interval measured value is greater than a first predetermined value for said signal received at said second input pin, setting a first factor at one, and otherwise setting said first factor at zero;
(d) accumulating samples of said signal received at said first input pin over said sample period to obtain an accumulated signal synch value for said signal received at said first input pin during said sample period;
(e) multiplying said respective synch-follower signal level of said signal received at said first pin times the number of samples accumulated in step (d) to obtain a synch-follower sample level;
(f) subtracting said synch-follower sample level from said accumulated signal synch value to obtain an accumulated sample difference value;
(g) if said accumulated difference value is less than a second predetermined value, setting a second factor at one, and otherwise setting said second factor at zero;
(h) measuring peak amplitude of received signal at said second input pin to obtain a peak value for said signal received at said second input pin;
(i) subtract said synch interval measured value for said signal received at said second input pin from said peak value for said signal received at said second input pin to obtain a peak difference value for said signal received at said second input pin;
(j) if said peak difference value is greater than a third predetermined value for said signal received at said second input pin, setting a third factor at zero, and otherwise setting said third factor at one;
(k) employing said first factor, said second factor and said third factor to effect said identification of received format according to predetermined relationships among said first factor, said second factor and said third factor.

2. A method for effecting initial identification of received format of a video signal at an input locus as recited in claim 1 wherein said first format is a broadcast RGB graphic signal format with raster synchronization on green.

3. A method for effecting initial identification of received format of a video signal at an input locus as recited in claim 2 wherein said second format is a component video color difference YPbPr video signal format with bi-level raster synchronization.

4. A method for effecting initial identification of received format of a video signal at an input locus as recited in claim 3 wherein said third format is a component video color difference YPbPr video signal format with tri-level raster synchronization.

5. A method for effecting initial identification of received format of a video signal at an input locus as recited in claim 4 wherein said reference level is zero volts, said first predetermined value is 50 millivolts, wherein said second predetermined value is 50 millivolts and wherein said third predetermined value is 350 millivolts.

6. A method for effecting initial identification of received format of a video signal at an input locus as recited in claim 4 wherein said predetermined relationships are embodied in the table:

| IF | | | THEN |
|---|---|---|---|
| 1st Factor AND | 2nd Factor AND | 3rd Factor | Received Format |
| 0 | 0 | 0 | RGB graphic signal format with raster synchronization on green; |
| 0 | 0 | 1 | Ambiguous; |
| 0 | 1 | 0 | ERROR; |
| 0 | 1 | 1 | YPbPr video signal format with tri-level raster synchronization; |
| 1 | 0 | 0 | ERROR; |
| 1 | 0 | 1 | YPbPr video signal format with bi-level raster synchronization; |
| 1 | 1 | 0 | ERROR; |
| 1 | 1 | 1 | YPbPr video signal format with tri-level raster synchronization. |

7. A method for effecting identification of received format of a video signal at an input locus including a first pin and a second pin; said video signal comprising a plurality of constituent signals including a raster-synchronizing constituent signal received at said first pin and a color-related constituent signal received at said second pin; said raster-synchronizing first constituent signal including a timing signal occupying a raster synch interval and a synch-follower signal level adjacent said raster synch interval; the method comprising the steps of:

(a) clamping said plurality of constituent signals to a reference level;

(b) measuring said color-related constituent signal during a sample period occupying at least a portion of said raster synch interval to obtain a synch interval measured value for said color-related constituent signal;

(c) if said synch interval measured value is greater than a first predetermined value for said color-related constituent signal, setting a first factor at one, and otherwise setting said first factor at zero;

(d) accumulating samples of said raster-synchronizing constituent signal over said sample period to obtain an accumulated signal synch value for said raster-synchronizing constituent signal during said sample period;

(e) multiplying said respective synch-follower signal level of said raster-synchronizing constituent signal times the number of samples accumulated in step (d) to obtain a synch-follower sample level;

(f) subtracting said synch-follower sample level from said accumulated signal synch value to obtain an accumulated sample difference value;

(g) if said accumulated difference value is less than a second predetermined value, setting a second factor at one, and otherwise setting said second factor at zero;

(h) measuring peak amplitude of said color-related constituent signal to obtain a peak value for said color-related constituent signal;

(i) subtracting said synch interval measured value for said color-related constituent signal from said peak value for said color-related constituent signal to obtain a peak difference value for said color-related constituent signal;

(j) if said peak difference value is greater than a third predetermined value for said color-related constituent signal, setting a third factor at zero, and otherwise setting said third factor at one;

(k) employing said first factor, said second factor and said third factor to effect said identification of received format according to predetermined relationships among said first factor, said second factor and said third factor.

8. A method for effecting identification of received format of a video signal at an input locus as recited in claim 7 wherein said reference level is zero volts, said first predetermined value is 50 millivolts, wherein said second predetermined value is 50 millivolts and wherein said third predetermined value is 350 millivolts.

9. A method for effecting initial identification of received format of a video signal at an input locus as recited in claim 8 wherein said predetermined relationships are embodied in the table:

| IF | | | THEN |
|---|---|---|---|
| 1st Factor AND | 2nd Factor AND | 3rd Factor | Received Format |
| 0 | 0 | 0 | RGB graphic signal format with raster synchronization on green; |
| 0 | 0 | 1 | Ambiguous; |
| 0 | 1 | 0 | ERROR; |
| 0 | 1 | 1 | YPbPr video signal format with tri-level raster synchronization; |
| 1 | 0 | 0 | ERROR; |
| 1 | 0 | 1 | YPbPr video signal format with bi-level raster synchronization; |
| 1 | 1 | 0 | ERROR; |
| 1 | 1 | 1 | YPbPr video signal format with tri-level raster synchronization. |

10. A method for identifying format of a received video signal; said video signal including a first raster-synchronizing constituent signal received at a first pin and a second color-related constituent signal received at a second pin; said first signal including a timing signal spanning a synch interval and a synch-follower signal level adjacent said synch interval; the method comprising the steps of:

(a) clamping said constituent signals to a reference signal level;

(b) measuring said second signal during said synch interval to obtain a synch-interval value for said second signal;

(c) if said synch-interval value is greater than a first predetermined value for said second signal, setting a first factor at one, else setting said first factor at zero;

(d) sampling said first signal n times during said synch interval to obtain an accumulated synch value for said first signal;

(e) multiplying said synch-follower signal times n to obtain a synch-follower sample level;

(f) subtracting said synch-follower sample level from said accumulated synch value to obtain a sample difference value;

(g) if said sample difference value is less than a second predetermined value, setting a second factor at one, else setting said second factor at zero;

(h) measuring peak signal amplitude of said second signal to obtain a peak value for said second signal;

(i) subtracting said synch-interval value for said second signal from said peak value for said second signal to obtain a peak difference value for said second signal;

(j) if said peak difference value is greater than a third predetermined value for said second signal, setting a third factor at zero, else setting said third factor at one;

(k) employing said first, second and third factors to effect said identifying according to predetermined relationships.

11. A method for identifying format of a received video signal as recited in claim 10 wherein said reference level is zero volts, said first predetermined value is 50 millivolts, wherein said second predetermined value is 50 millivolts and wherein said third predetermined value is 350 millivolts.

12. A method for identifying format of a received video signal as recited in claim 11 wherein said predetermined relationships are embodied in the table:

| IF | | | | | THEN |
|---|---|---|---|---|---|
| 1st Factor | AND | 2nd Factor | AND | 3rd Factor | Received Format |
| 0 | | 0 | | 0 | RGB graphic signal format with raster synchronization on green; |
| 0 | | 0 | | 1 | Ambiguous; |
| 0 | | 1 | | 0 | ERROR; |
| 0 | | 1 | | 1 | YPbPr video signal format with tri-level raster synchronization; |
| 1 | | 0 | | 0 | ERROR; |
| 1 | | 0 | | 1 | YPbPr video signal format with bi-level raster synchronization; |
| 1 | | 1 | | 0 | ERROR; |
| 1 | | 1 | | 1 | YPbPr video signal format with tri-level raster synchronization. |

13. A method for identifying format of a received video signal; said video signal including a first raster-synchronizing constituent signal and a second color-related constituent signal; said first signal including a timing signal spanning a synch interval and a synch-follower signal level adjacent said synch interval; the method comprising the steps of:

(a) ascertaining, in no particular order:
  (1) a first parameter comprising signal level of said second signal during said synch interval;
  (2) a second parameter comprising a difference between level of said first signal during said synch interval and said synch-follower level; and
  (3) a third parameter comprising peak excursion level for said second signal;

(b) in no particular order:
  (1) if said first parameter is greater than a first predetermined value, set a first factor at one, else set said first factor at zero;
  (2) if said second parameter is greater than a second predetermined value, set a second factor at one, else set said second factor at zero; and
  (3) if said third parameter is greater than a third predetermined value, set a third factor at zero, else set said third factor at one; and (c) employing said first factor, said second factor and said third factor to effect said identifying according to predetermined relationships.

* * * * *